United States Patent
Rondinone

(10) Patent No.: US 7,331,108 B2
(45) Date of Patent: Feb. 19, 2008

(54) METHOD AND DEVICE FOR USING COMPRESSED GAS AS A WEAPON

(76) Inventor: Gregory T. Rondinone, 10 Busher La., Hamden, CT (US) 06518

( * ) Notice: Subject to any disclaimer, the term of this patent is extended or adjusted under 35 U.S.C. 154(b) by 90 days.

(21) Appl. No.: 11/418,752

(22) Filed: May 5, 2006

(65) Prior Publication Data

US 2006/0288828 A1 Dec. 28, 2006

Related U.S. Application Data

(63) Continuation-in-part of application No. 11/166,729, filed on Jun. 27, 2005, now abandoned.

(51) Int. Cl.
*B26B 3/00* (2006.01)
*A01K 81/06* (2006.01)
*F41C 9/06* (2006.01)

(52) U.S. Cl. ............... 30/123.3; 30/125; 42/1.14; 43/6

(58) Field of Classification Search ........ 30/123, 30/123.3, 125, 358, 359; 42/1.14; 43/6
See application file for complete search history.

(56) References Cited

U.S. PATENT DOCUMENTS

| | | | |
|---|---|---|---|
| 2,964,031 A | 12/1960 | Dotson | 42/1.14 |
| 2,970,399 A | 2/1961 | Frohlich et al. | 43/6 |
| 2,981,026 A | 4/1961 | Wedrall | 43/6 |
| 3,530,580 A | 9/1970 | Shelnick | 30/359 |
| 3,751,843 A | 8/1973 | Shelnick | 43/6 |
| 3,888,033 A | 6/1975 | Fima | 43/6 |
| 4,541,194 A | 9/1985 | Mongiello, Jr. | 43/6 |
| 5,499,619 A | 3/1996 | Tarta | 124/57 |
| 5,566,858 A * | 10/1996 | Ducker, III | 222/3 |
| 5,943,806 A | 8/1999 | Underwood | 42/1.14 |
| 6,425,536 B2 * | 7/2002 | Namura | 239/390 |

* cited by examiner

*Primary Examiner*—Hwei-Siu C. Payer
(74) *Attorney, Agent, or Firm*—Wiggin and Dana LLP; Sherri T. Dente; Gregory S. Rosenblatt

(57) ABSTRACT

A knife includes a handle, a blade and a trigger. The handle has an internal cavity containing a compressed gas source and the blade is affixed to the handle. The blade has an internal bore running along a longitudinal axis from the handle to a point proximate a tip. The blade further has an aperture extending from a first edge to the internal bore at an angle relative to the longitudinal axis of between 15° and 75°. The trigger has a depressed position and a not depressed position. When in the depressed position, the internal bore communicates with the compressed gas source and when in said not depressed position, the internal bore is blocked from the compressed gas source. When a creature is pierced with the knife, the trigger is depressed injecting compressed gas into the creature greatly enhancing the incapacitating effect of the knife.

4 Claims, 5 Drawing Sheets

SECTION C-C

METHOD AND DEVICE FOR USING COMPRESSED GAS AS A WEAPON

CROSS REFERENCE TO RELATED APPLICATION(S)

This patent application is a continuation-in-part of commonly owned U.S. patent application Ser. No. 11/166,729 entitled "Method and Device for Using Compressed Gas as a Weapon" that was filed on Jun. 27, 2005. Patent application Ser. No. 11/166,729 is incorporated by reference in its entirety herein.

U.S. GOVERNMENT RIGHTS

N.A.

BACKGROUND OF THE INVENTION

1. Field of the Invention

This invention relates to a device to protect divers from undersea creatures, and more particularly to a utilitarian knife having a bore extending within the blade from a compressed gas source to an edge of the knife. After a creature is pierced, the diver actuates a trigger releasing compressed gas to travel through the bore and into the creature, thereby instantly disabling it.

2. Description of the Related Art

Experienced divers recognize that the undersea world is one of great mystery, beauty and history, but also potential dangers. The more equipped the diver to handle dangerous situations, the more rewarding the dive experience. One major concern to any diver is the possibility of an attack by an aggressive marine predator.

Many divers carry a knife or spear to ward off predators. However, stabbing a large undersea animal, such as a shark, usually infuriates the animal causing more aggressive behavior. A number of specialized weapons have been developed to protect the diver. For example, U.S. Pat. Nos. 2,970,399 and 3,751,843, both entitled "Underwater Weapon," disclose a stiletto having a blade with a circular cross-section and an internal bore running along the longitudinal axis of the blade. One end of the internal bore terminates at a through hole aperture that runs perpendicular to the internal bore. The other end terminates a compressed gas source. When an undersea creature is pierced with the stiletto, compressed gas is released into the creature disabling it and causing it to float to the surface. Both U.S. Pat. No. 2,970,399 and U.S. Pat. No. 3,751,843 are incorporated by reference in their entireties herein.

The compressed gas stilettos of the prior art have a single function and are not utilitarian. The diver usually needs a knife for non-defensive purposes, such as cutting ropes or prying rusted hinges. As such, the diver must care both a compressed gas stiletto and a knife. Further, the transverse through hole of the compressed gas stiletto expels the compressed gas close to the surface of the pierced creature where the disabling effects of the gas are less effective.

There remains, therefore, a need for a compressed gas weapon capable of disabling an undersea creature that does not suffer from the disadvantages of the prior art.

BRIEF SUMMARY OF THE INVENTION

The details of one or more embodiments of the invention are set forth in the accompanying drawings and the description below. Other features, objects and advantages of the invention will be apparent from the description and drawings, and from the claims.

In accordance with the invention, there is provided a knife includes a handle, a blade and a trigger. The handle has an internal cavity containing a compressed gas source and the blade is affixed to the handle. The blade has an internal bore running along a longitudinal axis from the handle to a point proximate a tip. The blade further has an aperture extending from a first edge to the internal bore at an angle relative to the longitudinal axis of between 15° and 75°. The trigger has a depressed position and a not depressed position. When in the depressed position, the internal bore communicates with the compressed gas source and when in said not depressed position, the internal bore is blocked from the compressed gas source. When a creature is pierced with the knife, the trigger is depressed injecting compressed gas into the creature greatly enhancing the incapacitating effect of the knife.

It is a feature of the invention that the knife is particularly useful for a diver and that when an undersea creature is pierced, the compressed gas both causes tissue and organ damage and provides buoyancy to float the creature towards the surface.

BRIEF DESCRIPTION OF THE DRAWINGS

Like reference numbers and designations in the various drawings indicated like elements.

DETAILED DESCRIPTION

Figure 1:
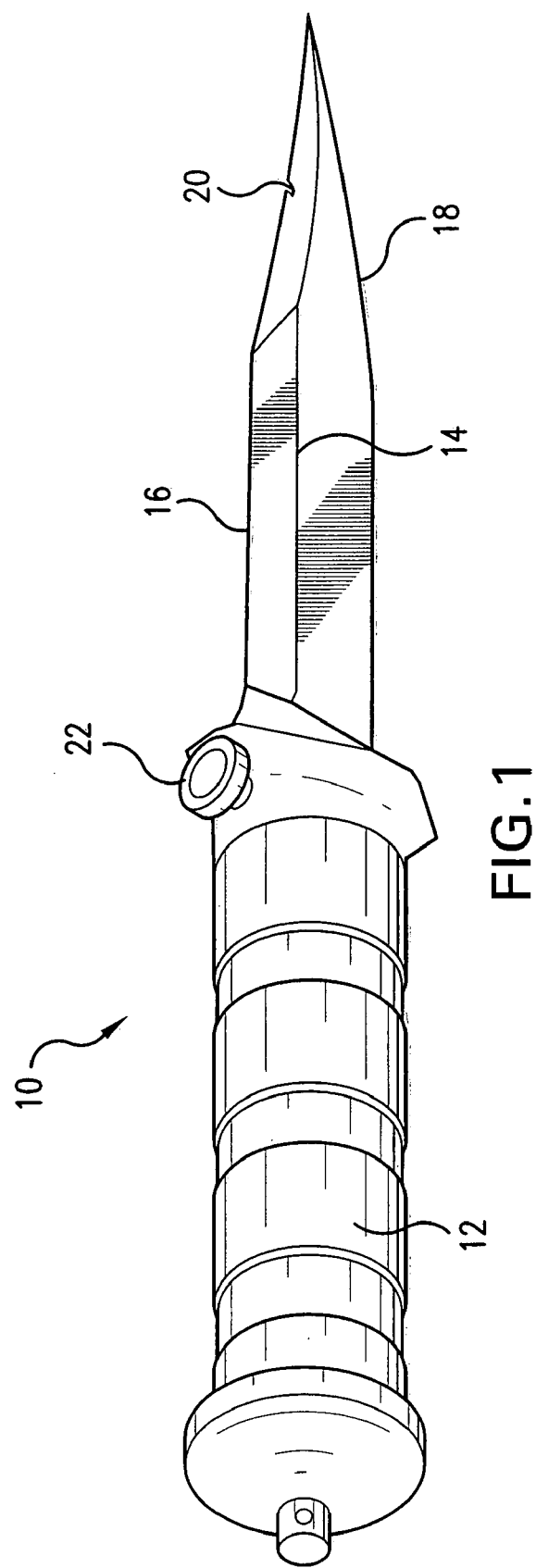
FIG. 1 illustrates the undersea weapon of the invention.

FIG. 1 illustrates an undersea weapon 10 having a handle 12 and knife blade 14. The knife blade has at least a first cutting surface 16 and, preferably, also has a second cutting surface 18. As such, the undersea weapon 10 is useful for use by a diver to cut ropes, vegetation and other objects. An aperture 20 extends to the first cutting surface 16 at an angle to a longitudinal axis of the undersea weapon. A trigger 22 is disposed between the handle 12 and knife blade 14. When the trigger is depressed, a compressed gas contained within the handle is released via aperture 20. If the knife blade 14 has pierced an undersea creature, the compressed gas is injected into the creature causing damage to the creature's tissue and organs, thereby disabling it. The gas also increases the buoyancy of the creature causing it to rise toward the surface and suffer severe overexpansion damage by rapid expansion of the gas due to the release of ambient pressure as the creature rises to the surface.

The knife handle is of a length and diameter to be easily held by a diver wearing rubberized gloves. An exemplary handle has a length of from five to eight inches and a diameter on the order of between 1.2 and 1.5 inches. The length of the knife blade is dependent on the intended uses and the creatures most likely to be encountered. Exemplary knife blades are from four inches to eight inches in length.

Figure 2:
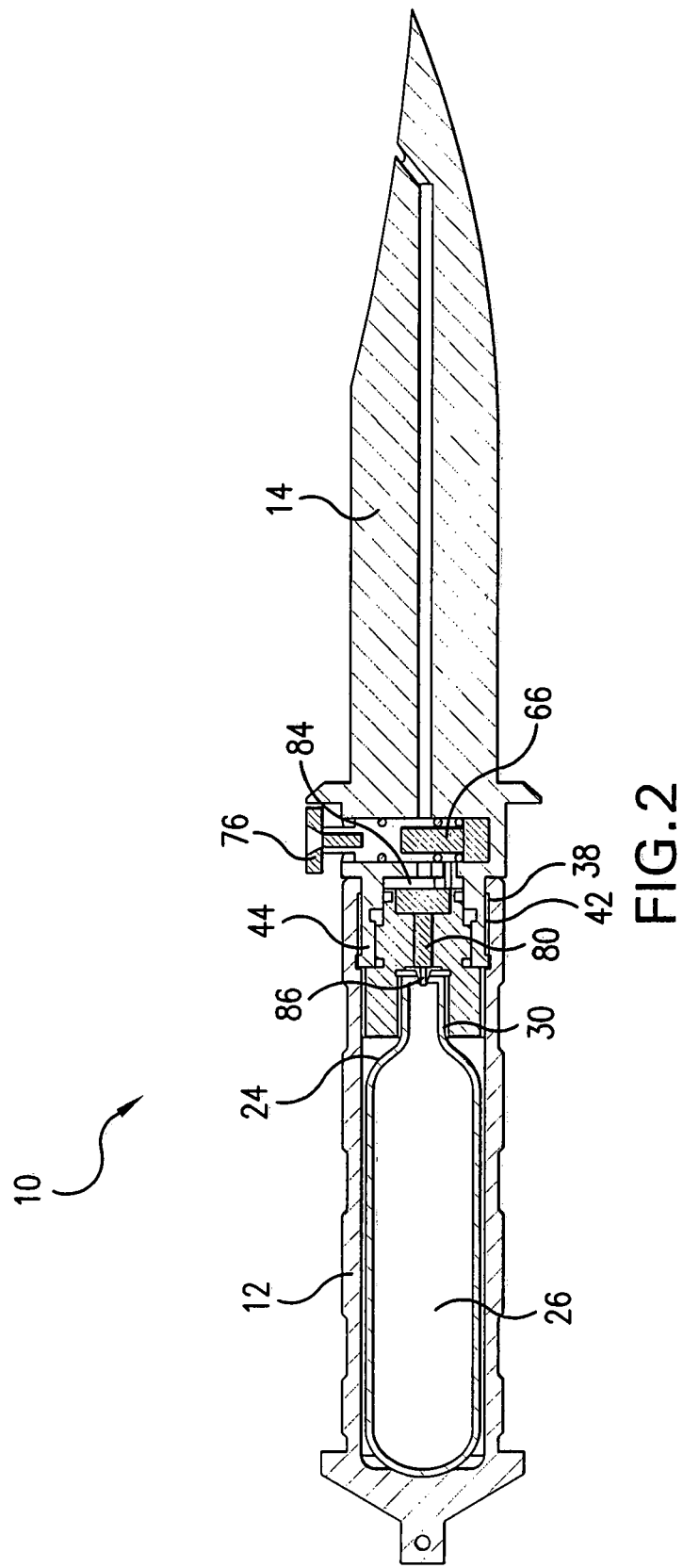
FIG. 2 illustrates the undersea weapon of FIG. 1 in cross-sectional representation.

FIG. 2 illustrates the undersea weapon 10 in cross-sectional representation. The handle 12 includes an internal cavity 24 shaped to received a compressed gas cylinder 26. An exemplary compressed gas cylinder has a diameter of about one inch and a length of about 3.5 inches. The compressed gas cylinder holds about 80 inches$^3$ of gas and a nominal pressure of 850 pounds per square inch at 70° F. The gas is preferably non-flammable and most preferably is carbon dioxide. Rapid expansion of the gas on release from the compressed gas cylinder occurs with a significant reduction of temperature, on the order of −60° F. for $CO_2$. Therefore, further incapacitation of the creature if caused by the cryogenic effect of the expanding gas. Suitable $CO_2$ compressed gas cylinders may be obtained from Leland Limited, Inc. of South Plainfield, N.J.

Figure 3:
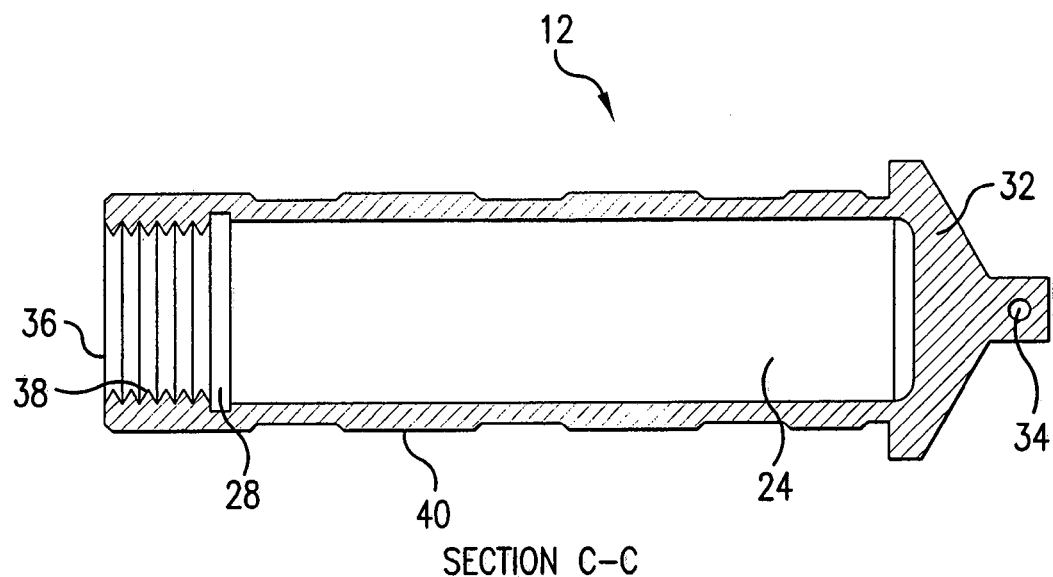
FIG. 3 illustrates the handle of the undersea weapon of FIG. 1 in cross-sectional representation.
Figure 4:
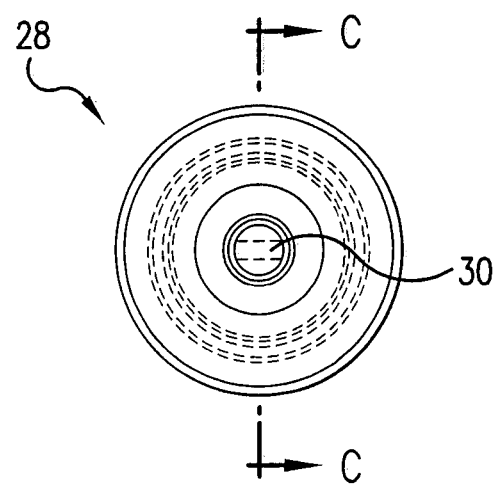
FIG. 4 illustrates an apertured washer portion of the handle of FIG. 3.

Referring to FIG. 3, the handle 12 includes an apertured washer 28 that is shown in frontal view in FIG. 4. The apertured washer includes cylinder neck aperture 30. As shown in FIG. 2, the neck of the compressed gas cylinder 26 extends through the cylinder neck aperture 30 while the remainder of the compressed gas cylinder is held substantially fixed in place within internal cavity 24.

Referring back to FIG. 3, the handle 12 terminates at a butt end 32 that may include a hook or hole 34 for attaching the knife to the diver's belt or elsewhere. The front end 36 of the handle 12 includes internal threads 38 for engaging the knife blade. The outer surface 40 of the handle may include ridges or other features to enable the diver to more firmly grasp the knife. The handle is formed from a corrosion resistant material such as anodize aluminum.

Figure 5:
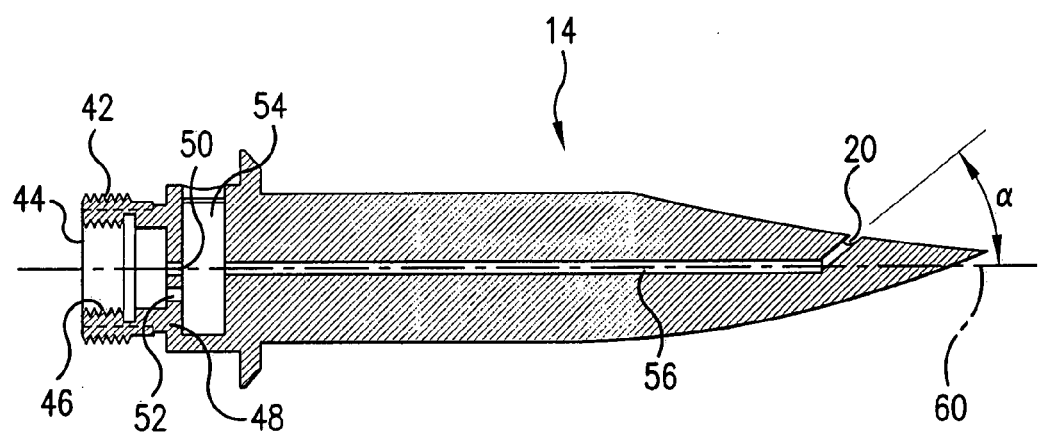
FIG. 5 illustrates the knife blade of the undersea weapon of FIG. 1 in cross-sectional representation.

Referring back to FIG. 2, external threads 42 on the aft end 44 of the knife blade 14 engage the internal threads 38 of the handle 12 forming a unitary knife 10. FIG. 5 illustrates the knife blade 14 in cross-sectional representation. Aft end 44 of the knife blade 14 includes external threads 42 for engaging the handle and internal threads 46 for engaging a conduit as described below. Forward of the aft end 44 is a plate 48 having a first gas transmitting aperture 50 and a vent hole 52 extending therethrough. The forward end of the plate 48 defines a sidewall of a trigger receiving cavity 54. When the trigger is not depressed, pressurized gas flows through the first gas transmitting aperture 50 and is blocked by an O-ring circumscribing the trigger. When the trigger is intentionally depressed, pressurized gas flows through the first gas transmitting aperture 50 and exits at aperture 20 via through internal bore 56.

Figure 6:
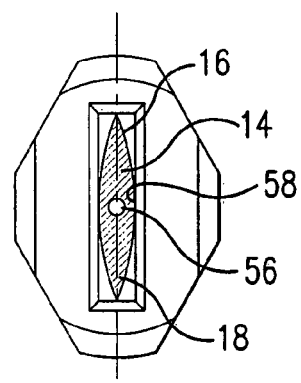
FIG. 6 is another cross-sectional representation of the knife blade illustrating a gas transmitting internal bore.

As shown in FIG. 6, the knife blade 14 has a relatively (on the order of 0.25 inch) thick central portion 58 terminating at first 16 and second 18 relatively thin cutting surfaces. The internal bore 56 extends through the central portion 58 and has a diameter that is from 0.25 to 0.75, and preferably about 0.5 times the thickness of the central portion. The internal bore may have any desired cross-section and may be formed by any suitable means. After the knife blade is cast, the internal bore is formed by any suitable subtractive process such as drilling, laser ablation or electrical discharge machining (EDM). The knife blade is formed from a durable, corrosion-resistant material, such as stainless steel.

Referring back to FIG. 5, the internal bore 56 terminates at aperture 20. Aperture 20 exits the knife blade 14 at an angle, α, relative to a longitudinal axis 60 of the knife blade, of between 15° and 75° and preferably the angle, α, is from 30° to 40°. It is a benefit of the angle, α, that by being less than 90° the compressed gas penetrates more deeply into the pierced creature.

Figure 7:
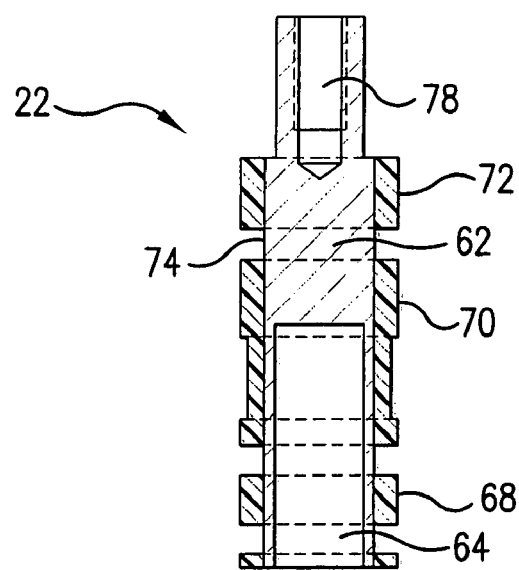
FIG. 7 illustrates a trigger for the undersea weapon of the invention.

FIG. 7 illustrates a trigger 22 in cross-sectional representation. The trigger has a central shaft 62 formed from a corrosion resistant high strength material, such as stainless steel. A first blind bore 64 aligns with a trigger guide (66 in FIG. 2) to prevent the trigger from jamming. Surrounding the central shaft 62 are a plurality of compliant bands, such as first 68, second 70 and third 72 neoprene O-rings. The O-rings are sized to be slightly larger than the diameter of the trigger receiving cavity (54 in FIG. 5) and form a compression fit to keep the trigger in a not actuated position until depressed by the diver. When in the not actuated position, the first gas transmitting aperture (50 in FIG. 5) is blocked by second O-ring 70. When in the actuated position, the first gas transmitting aperture aligns with gap 74 between the second 70 and third 72 O-rings enabling compressed gas to flow to the knife blade via the gap. A thumb piece (76 in FIG. 2) fits into the second blind bore 78 to facilitate depression of the trigger by a diver wearing gloves.

Figure 8:
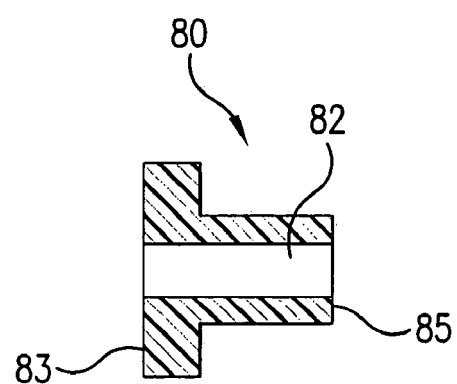
FIG. 8 illustrates a conduit for transmitting compressed gas to the knife blade of the invention.

FIG. 8 illustrates a conduit 80 for the transfer of compressed gas from the cylinder container within the handle to the internal bore of the knife blade. Conduit 80 includes a through hole 82. As best shown in FIG. 2, a first end 83 of the conduit 80 is pressed firmly against a compliant washer 84 forming a gas-tight seal. The first end may include external threads (not shown) to engage the internal threads (46 of FIG. 5) of the knife blade. The opposing second end 85 of the conduit presses a needle valve 86 into compressed gas cylinder 26 creating a passageway for the compressed gas.

While particularly suited for use in underwater environments, the compressed gas knife of the invention may be used in other environments where rapid incapacitation of a predator or enemy is required. For example, the knife is useful in wilderness areas having aggressive animals, such as bears. The knife also has military applications, such as where forces must quickly and silently incapacitate an enemy combatant.

One or more embodiments of the present invention have been described. Nevertheless, it will be understood that various modifications may be made without departing from the spirit and scope of the invention. Accordingly, other embodiments are within the scope of the following claims.

What is claimed is:

1. A knife comprising:
   a handle having an internal cavity;
   a compressed gas cylinder disposed within said internal cavity;
   a blade affixed to said handle, said blade having a first edge and a second edge at least one of which is effective for cutting, said blade also having an internal bore running along a longitudinal axis of said knife from said handle to a point proximate a tip of said blade, said blade further having an aperture extending from said first edge of said blade to said internal bore at an angle relative to said longitudinal axis of between 15° and 75° and;
   a trigger having a central shaft with a plurality of O-rings circumscribing said central shaft, said trigger moveable between a depressed position and a not depressed position wherein when in said depressed position, said internal bore is in communication with said compressed gas cylinder in said handle and when in said not depressed position, said internal bore is blocked from communication with said compressed gas cylinder in said handle.

2. The knife of claim 1 wherein said compressed gas cylinder has therein a pressurized gas comprising carbon dioxide.

3. The knife of claim 1 wherein one of said plurality of O-rings blocks the flow of compressed gas when said trigger is in the not depressed position and a gap between two of said plurality of O-rings enables the flow of compressed gas to said internal bore when said trigger is in the depressed position.

4. The knife of claim 3 wherein said aperture extends from said internal bore at an angle of from 30° to 40° relative to said longitudinal axis.

* * * * *